June 4, 1935.   A. F. MASURY   2,003,548
INDEPENDENTLY MOUNTED TRACTION UNIT
Filed Jan. 29, 1932    2 Sheets-Sheet 1
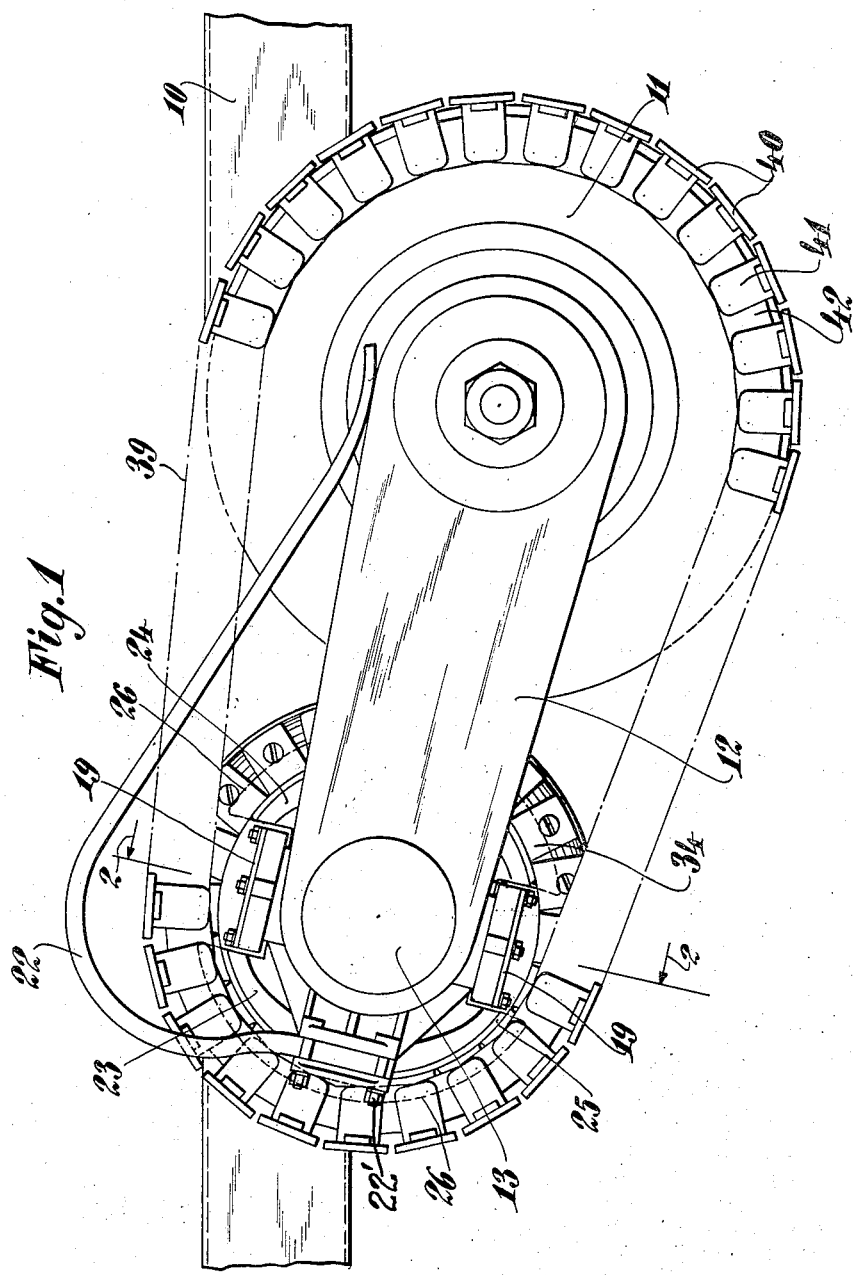
INVENTOR
*Alfred F. Masury,*
BY
*Redding, Greeley, O'Shea & Campbell*
HIS ATTORNEYS

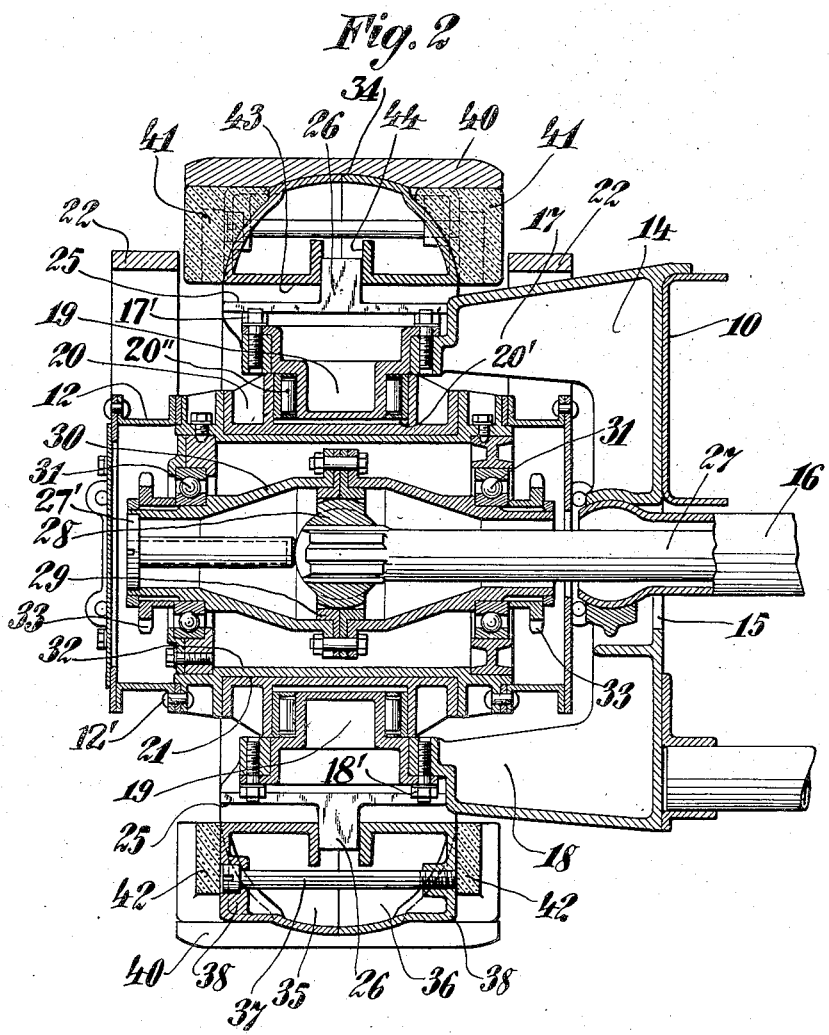

Patented June 4, 1935

2,003,548

UNITED STATES PATENT OFFICE 2,003,548

INDEPENDENTLY MOUNTED TRACTION UNIT

Alfred F. Masury, New York, N. Y., assignor to International Motor Company, New York, N. Y., a corporation of Delaware Application January 29, 1932, Serial No. 589,620

5 Claims. (Cl. 305—8)

The present invention relates to drives for motor vehicles and embodies, more specifically, an improved drive for independently mounted wheels in which one or more of such independently mounted wheels is driven to actuate an endless track which is mounted over the wheel and a suitable take-up mounting.

Independently mounted wheels, as such, have heretofore been suggested and various drives designed by means of which power may be applied thereto. These wheels are mounted as units upon the vehicle and are independent of other wheels which support the weight thereof. In order that the traction available from such independently mounted wheels may be materially increased under difficult conditions of terrane and operation, the present invention has been designed and provides an endless track construction which is mounted over the independently mounted wheel and over a suitable idler construction to increase the surface contact between the driving element (the track) and the terrane.

The obvious advantages resulting from such construction need not be enumerated herein and an object of the invention comprises the provision of a means for increasing the traction between an independently mounted wheel and the terrane over which it moves.

A further object of the invention is to provide an endless track construction for use in connection with independently mounted wheels.

A further object of the invention is to provide, in combination with independently mounted wheels, an endless track, and means for mounting the same over the wheel and a suitable element of the structure upon which the wheel is mounted.

A further object of the invention is to provide an endless track construction for use upon independently mounted wheels, the track being mounted over the wheel at one end, and an idler device which is concentric with the mounting of the wheel upon the vehicle frame, such idler device serving to take up the slack in the track.

Further objects, not specifically enumerated above, will be apparent as the invention is described in greater detail in connection with the accompanying drawings, wherein:

Figure 1 is a view in side elevation showing an endless track constructed in accordance with the present invention.

Figure 2 is a view in section, taken on line 2—2 of Figure 1, and looking in the direction of the arrows.

With reference to the above drawings, a vehicle frame is indicated at 10 and a wheel at 11, the wheel being mounted upon arms 12 which are journaled at 13 upon the frame 10. The journalling of the arms is effected by means of a bracket 14 (Figure 2) which is secured to the frame 10, the bracket being formed with an aperture 15 through which an axle housing 16 extends. The bracket is formed with vertically spaced upper and lower arms 17 and 18, respectively, such arms being provided with trunnions 19, secured thereto by bolts 17' and 18', respectively, to permit the mounting arms 12 to move in a plane at right angles to the trunnions. Upon the trunnions a ring 20 is journaled, this ring being formed with a central bearing 21 which is coaxial with the axle housing 16 and sockets 20' having bearings 20" to receive trunnions 19. The ring 20 also carries springs 22 which are secured thereto by bolts 22' and engage the lower extremity of the arms 12 to provide the desired spring connection between the frame 10 and the wheel 11.

Also upon ring 20, as at 23' and 24', are mounted arcuate brackets 23 and 24, each of which is formed with a peripheral bearing surface 25 and a positioning rib 26. The positioning rib 26 always lies in a plane parallel to the arms 12 and preferably passes through the center line of wheel 11. Incidentally, the rib 26 lies in a plane passing through the axis of the trunnions 19 and orients itself in accordance with the movement of ring 20 about such trunnions.

Within the axle housing 16, a jack shaft 27 is mounted, the jack shaft being splined to a universal joint member 28 which cooperates with a joint member 29 to transmit rotary motion from the shaft 27 to the driven housing 30. A pin 27' is provided to locate the member 28. The ends of housings 30 are journaled at 31 in bearings carried by a cylindrical member 32 which is journaled in the bearing 21. The ends of housings 30 are formed with driving sprockets 33 over which suitable chains may be mounted to transmit the drive to cooperating sprockets for driving the wheel 11. These chains may be housed in the arms 12 and, in as much as this specific construction forms no part of the present invention, further description thereof herein is deemed unnecessary.

Upon the cylindrical surface 25, an idler rim 34 is provided, this rim being formed of cooperating sections 35 and 36 which are bolted together by bolts 37. The sections 35 and 36 are formed with bosses 38 into which the bolts are inserted and to which they are secured. Between the bosses, the idler rim is formed with a profile similar to the profile of the tire on wheel 11 and an endless track 39 is mounted thereon. This track extends from the idler rim 34 to the wheel 11 and is composed of a plurality of tread members 40 having side guards 41 which are adapted to engage the sides of the tire on the wheel 11 and the sides of the curved portions between bosses 38 upon the idler rim 34. The treads may be suitably spaced and the side guards 41 linked together at 42, these links engaging the bosses 38 to facilitate the movement of the track over the idler rim.

The sections 35 and 36 are formed with a cylindrical inner periphery as shown at 43 for engaging the cylindrical surface 25 and sliding thereover. Spaced cylindrical flanges 44 are formed on the sections 35 and 36 and are adapted to be mounted upon opposite sides of the rib 26 in order that the idler rim 34 may be effectively positioned against lateral displacement.

From the foregoing, it will be seen that rotation of the wheel 11 causes the track 39 and idler rim 34 to move over the bearing surface 25 and if the wheel moves over soft or difficult terrane, the lower track section between the idler rim 34 and wheel 11 increases the surface contact between the driving member and terrane.

While the invention has been described with specific reference to the accompanying drawings, it is not to be limited, save as defined in the appended claims.

I claim as my invention:

1. In combination with a vehicle frame and a wheel mounting arm and wheel mounted as a unit thereon, means to journal the arm on the frame, a cylindrical bearing member carried by the arm journaling means, an idler rim journaled upon the bearing member, and an endless track trained about said wheel and idler rim.

2. In combination with a vehicle frame and a wheel mounting arm and wheel mounted as a unit thereon, means to journal the arm on the frame, a cylindrical bearing member carried by the arm journaling means, a peripheral rib on the bearing member, an idler rim journaled upon the bearing member and formed with a groove to engage the rib, and an endless track trained about said wheel and idler rim.

3. In combination with a vehicle frame and a wheel mounting arm and wheel mounted as a unit thereon, means to journal the arm on the frame, a cylindrical bearing member carried by the arm journaling means, a peripheral rib on the bearing member, an idler rim journaled upon the bearing member and formed with a groove to engage the rib, said idler rim being formed with a profile similar to the tire of the wheel journaled upon the arm, and an endless track trained about said wheel and idler rim.

4. In combination with a vehicle frame and an arm connected thereto having a wheel mounted at one end thereof and an idler rim at the other, said arm and wheel constituting an independent wheel unit and an endless track mounted over the wheel and the idler rim, said rim being spaced from the wheel mounting and the plane of the lowest track engaging point of the wheel and means to journal the arm on the frame at the idler rim end thereof.

5. In combination, a vehicle frame, a wheel mounting arm, means to journal one end of the arm on the frame, a wheel journaled at the other end of the arm, the arm and wheel being mounted as an independent wheel unit on the frame, an idler rim at the first end of the arm journaled concentric with the mounting of the arm upon the frame, means to hold the wheel in operative position, and an endless track mounted over the wheel and the idler rim.

ALFRED F. MASURY.